United States Patent
Park et al.

(10) Patent No.: US 9,609,672 B2
(45) Date of Patent: Mar. 28, 2017

(54) RADIO RESOURCE MANAGEMENT APPARATUS OF BASE STATION IN MOBILE COMMUNICATION SYSTEM AND METHOD OF MANAGING THE SAME

(71) Applicant: ELECTRONICS AND TELECOMMUNICATIONS RESEARCH INSTITUTE, Daejeon (KR)

(72) Inventors: SoonGi Park, Daejeon (KR); DongSeung Kwon, Daejeon (KR); Kyung Sook Kim, Daejeon (KR); Jun Sik Kim, Daejeon (KR); Pyeong Jung Song, Daejeon (KR); Sang Chul Oh, Daejeon (KR); Yong Seouk Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 198 days.

(21) Appl. No.: 14/686,745

(22) Filed: Apr. 14, 2015

(65) Prior Publication Data
US 2016/0183230 A1 Jun. 23, 2016

(30) Foreign Application Priority Data

Dec. 19, 2014 (KR) .................. 10-2014-0184920

(51) Int. Cl.
*H04W 76/02* (2009.01)
*H04W 72/08* (2009.01)
(Continued)

(52) U.S. Cl.
CPC ......... *H04W 76/02* (2013.01); *H04W 72/087* (2013.01); *H04W 16/02* (2013.01); *H04W 88/08* (2013.01)

(58) Field of Classification Search
CPC .. H04W 72/0446; H04W 72/04; H04W 76/02
(Continued)

(56) References Cited

U.S. PATENT DOCUMENTS

2011/0280203 A1\* 11/2011 Han ...................... H04L 1/0031
370/329
2011/0299488 A1\* 12/2011 Kim ...................... H04W 16/16
370/329
(Continued)

FOREIGN PATENT DOCUMENTS

KR 2010-0065565 A 6/2010
KR 2011-0138744 A 12/2011

OTHER PUBLICATIONS

Soongi Park et al., "Design and Capacity Evaluation of New mmWave-based Multi-Spot Beam Cellular System", 2014 8th International Conference on Future Generation Communication and Networking. pp. 3-8, Dec. 20-23, 2014.
(Continued)

*Primary Examiner* — Kamran Afshar
*Assistant Examiner* — Farideh Madani
(74) *Attorney, Agent, or Firm* — Rabin & Berdo, P.C.

(57) ABSTRACT

A base station of a mobile communication system divides an ultra wideband into a plurality of unit bands, uses a plurality of beam component carriers corresponding to the L3 CP dedicated unit band as a coverage layer by grouping in one cell in the L3 CP dedicated unit band and uses a plurality of beam component carriers corresponding to the UP dedicated unit band in the UP dedicated unit band as a plurality of
(Continued)

capacitor layers by grouping in a plurality of cells of a smaller size than that of the grouping.

19 Claims, 14 Drawing Sheets

(51) Int. Cl.
*H04W 88/08* (2009.01)
*H04W 16/02* (2009.01)

(58) Field of Classification Search
USPC .................. 455/450, 451, 452.1, 452.2, 453
See application file for complete search history.

(56) References Cited

U.S. PATENT DOCUMENTS

| | | |
|---|---|---|
| 2013/0094467 A1 | 4/2013 | Kwon et al. |
| 2013/0114531 A1 | 5/2013 | Ahn et al. |
| 2014/0043955 A1 | 2/2014 | Ko et al. |

OTHER PUBLICATIONS

Soongi Park et al., "Novel Cellular System Design using Standalone and Centralized mmWave-based Multi-Spot Beam Structure", International Journal of Control and Automation, vol. 8, No. 2 (2015) pp. 337-350, 2015.

* cited by examiner (A)

(B)

(C)

RADIO RESOURCE MANAGEMENT APPARATUS OF BASE STATION IN MOBILE COMMUNICATION SYSTEM AND METHOD OF MANAGING THE SAME

CROSS-REFERENCE TO RELATED APPLICATION

This application claims priority to and the benefit of Korean Patent Application No. 10-2014-0184920 filed in the Korean Intellectual Property Office on Dec. 19, 2014, the entire contents of which are incorporated herein by reference.

BACKGROUND OF THE INVENTION (a) Field of the Invention

The present invention relates to a radio resource management apparatus of a base station in a mobile communication system, and a method of managing the same. More particularly, the present invention relates to a method and apparatus for managing a radio resource for efficiently operating an ultra wideband.

(b) Description of the Related Art

There are three methods for preparing for a heavy increase of mobile traffic in a mobile communication system. A first method is to enhance spectrum efficiency of a frequency, a second method is to increase a use frequency, and a third method is to densely make a small cell.

In the second method, because an existing cellular frequency is already depleted, new technology development for using an ultra band based on a super high frequency (millimeter wave) in a mobile communication system is requested. Technology on a short distance/fixed wireless communication field based on a present millimeter wave exists, but technology for efficiently operating an ultra band based on a millimeter wave in a base station is very insufficient.

SUMMARY OF THE INVENTION

The present invention has been made in an effort to provide a method and apparatus for managing a radio resource in a mobile communication system having advantages of being capable of efficiently operating an ultra band based on a millimeter wave in a mobile communication system.

An exemplary embodiment of the present invention provides a method of managing a radio resource of a base station in a mobile communication system. The method includes: dividing a plurality of unit bands of a ultra wideband into a Layer 3 Control Plane (L3 CP) dedicated unit band and at least one User Plane (UP) dedicated unit band; using a plurality of beam component carriers corresponding to the L3 CP dedicated unit band in the L3 CP dedicated unit band as a coverage layer by grouping in one cell; and using a plurality of beam component carriers corresponding to the UP dedicated unit band in the UP dedicated unit band as a plurality of capacitor layers by grouping in a plurality of cells of a size smaller than that of the grouping.

The using of a plurality of beam component carriers corresponding to the L3 CP dedicated unit band may include: performing Radio Resource Control (RRC) connection setting with the terminal through an L3 CP dedicated unit band that is allocated to the terminal; and transmitting and receiving data to and from the terminal through the L3 CP dedicated unit band.

The using of a plurality of beam component carriers corresponding to the UP dedicated unit band may include: adding a UP dedicated unit band to the terminal based on a performance and a QoS (Quality of Service) request of the terminal; and deleting at least one of UP dedicated unit bands that are allocated to a terminal based on a performance and a QoS request of the terminal.

The adding of a UP dedicated unit band may include: transmitting an RRC connection reconfiguration message to the terminal in the L3 CP dedicated unit band; and receiving an RRC connection reconfiguration complete message from the terminal in the L3 CP dedicated unit band, wherein the RRC connection reconfiguration message may include an index of a UP dedicated unit band to add.

The deleting of at least one of UP dedicated unit bands may include: transmitting an RRC connection reconfiguration message to the terminal in the L3 CP dedicated unit band; and receiving an RRC connection reconfiguration complete message from the terminal in the L3 CP dedicated unit band, wherein the RRC connection reconfiguration message may include an index of a UP dedicated unit band to delete.

The using of a plurality of beam component carriers corresponding to the UP dedicated unit band may further include: transmitting a UE capability enquiry message to the terminal; and receiving a UE capability information message including performance information of the terminal from the terminal, wherein the performance information of the terminal may include bitmap having a value of 0 or 1 according to whether the performance information can be used to correspond to each of the plurality of unit bands.

The transmitting and receiving of data may include transmitting and receiving the data with the L3 CP dedicated unit band and the added UP dedicated unit band.

The using of a plurality of beam component carriers corresponding to the UP dedicated unit band may further include activating only a necessary unit band according to a QoS request of the terminal among UP dedicated unit bands that are allocated to the terminal.

The using of a plurality of beam component carriers corresponding to the UP dedicated unit band may include connecting a capacitor layer appropriate to the terminal based on a performance and a QoS request of the terminal among a plurality of capacitor layers.

The using of a plurality of beam component carriers corresponding to the L3 CP dedicated unit band may include allocating different unit bands between base stations to an L3 CP dedicated unit band.

The using of a plurality of beam component carriers corresponding to the UP dedicated unit band may include allocating, by a neighboring base station, a unit band that is allocated as an L3 CP dedicated unit band to a UP dedicated unit band of a terminal that is accessed to a time different from a neighboring base station.

Another embodiment of the present invention provides a radio resource management apparatus of a base station in a mobile communication system. The radio resource management apparatus includes a processor and a transceiver. The processor divides and operates a plurality of unit bands of a ultra wideband into a Layer 3 Control Plane (L3 CP) dedicated unit band and a User Plane (UP) dedicated unit band and that uses a plurality of beam component carriers corresponding to the L3 CP dedicated unit band as a coverage layer by grouping in one cell to service coverage including a plurality of beams, uses a plurality of beam component carriers corresponding to a UP dedicated unit band as a plurality of capacitor layers by grouping in a plurality of cells of a size smaller than that of the grouping, and allocates a unit band to use as an L3 CP dedicated unit band and a UP dedicated unit band to an accessed terminal. The transceiver transmits and receives data to and from the terminal through a unit band that is allocated to the terminal.

The processor may perform Radio Resource Control (RRC) connection setting and RRC connection reconfiguration with the terminal through a unit band that is allocated with the L3 CP dedicated unit band to the terminal and may add a unit band to use as the UP dedicated unit band to the terminal based on a performance and a QoS request of the terminal through a unit band that is allocated to the L3 CP dedicated unit band or may delete at least one unit band of UP dedicated unit bands that are allocated to the terminal.

The processor may add the unit band through the RRC connection reconfiguration or may delete the at least one unit band.

The processor may transmit an RRC connection reconfiguration message to the terminal through the transceiver in the L3 CP dedicated unit band, and the RRC connection reconfiguration message may include an index of a UP dedicated unit band to add or an index of a UP dedicated unit band to delete.

The processor may connect a capacitor layer appropriate to the terminal based on a performance and a QoS request of the terminal of the plurality of capacitor layers.

The processor may allocate a unit band different from a neighboring base station to an L3 CP dedicated unit band of the terminal.

The processor may allocate a unit band that is allocated to an L3 CP dedicated unit band to the neighboring base station to the UP dedicated unit band at a different time from the neighboring base station.

The transceiver may receive performance information of the terminal from the terminal, the processor may allocate a unit band to use as the UP dedicated unit band based on performance information of the terminal, and the performance information of the terminal may include bitmap having a value of 0 or 1 according to whether the performance information can be used to correspond to each of the plurality of unit bands.

DETAILED DESCRIPTION OF THE EMBODIMENTS

Figure 1:
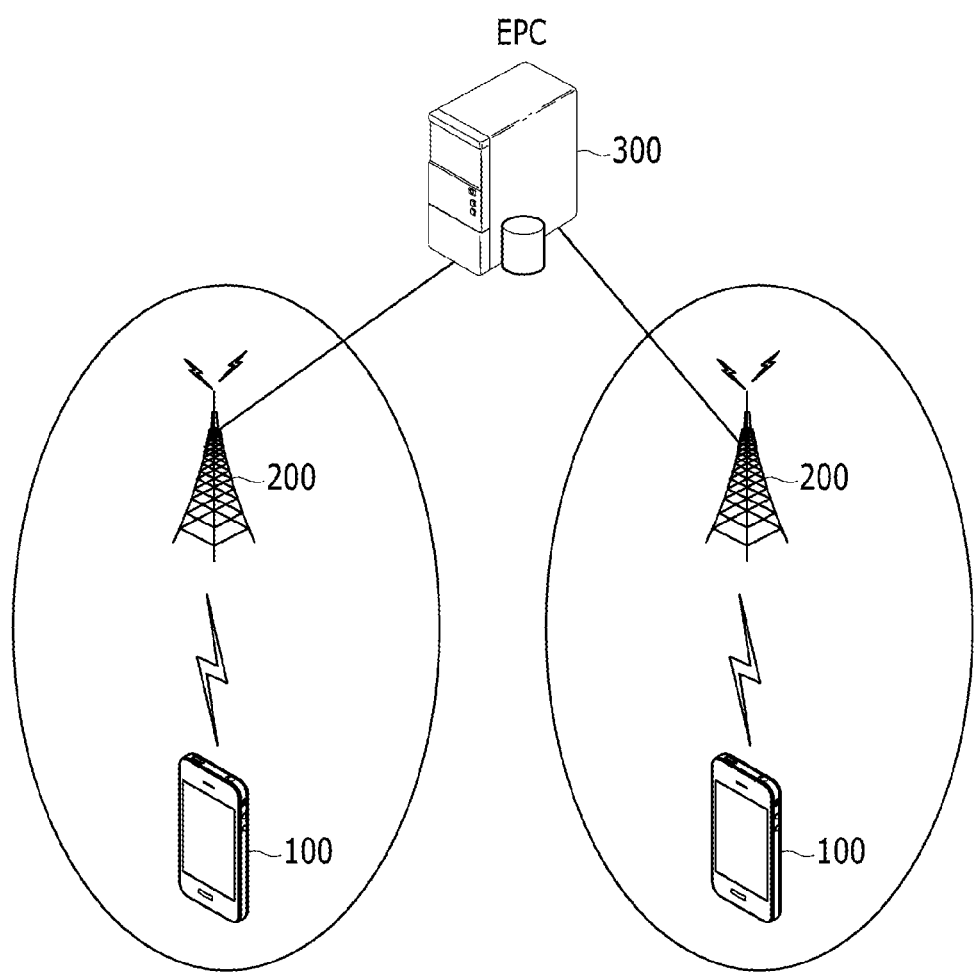
FIG. 1 is a diagram illustrating a mobile communication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification and claims, unless explicitly described to the contrary, the word "comprise" and variations such as "comprises" or "comprising" will be understood to imply the inclusion of stated elements but not the exclusion of any other elements. In addition, the terms "-er", "-or", "module", and "block" described in the specification mean units for processing at least one function and operation and can be implemented by hardware components or software components and combinations thereof.

In an entire specification, a terminal may indicate a mobile terminal (MT), a mobile station (MS), an advanced mobile station (AMS), a high reliability mobile station (HR-MS), a subscriber station (SS), a portable subscriber station (PSS), an access terminal (AT), and user equipment (UE), and may include an entire function or a partial function of the MT, the MS, the AMS, the HR-MS, the SS, the PSS, the AT, and the UE.

Further, a base station (BS) may indicate an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) that performs a BS function, a relay node (RN) that performs a BS function, an advanced relay station (ARS) that performs a BS function, a high reliability relay station (HR-RS) that performs a BS function, and a small-sized BS [a femto BS, a home node B (HNB), a home eNodeB (HeNB), a pico BS, a metro BS, and a micro BS] and may include an entire function or a partial function of the ABS, the nodeB, the eNodeB, the AP, the RAS, the BTS, the MMR-BS, the RS, the RN, the ARS, the HR-RS, and the small-sized BS.

Hereinafter, a method and apparatus for managing a radio resource in a mobile communication system according to an exemplary embodiment of the present invention will be described in detail with reference to the drawings.

FIG. 1 is a diagram illustrating a mobile communication system according to an exemplary embodiment of the present invention.

Referring to FIG. 1, the mobile communication system includes a terminal 100, a base station 200, and an Evolved Packet Core (EPC) 300.

The terminal 100 receives a communication service through wireless communication by accessing to the base station 200. The communication service may be, for example, a voice service or a data service.

The base station 200 manages a cell and supports wireless communication to the terminal 100 within the cell. The cell may be a cell of a general cellular system. The base station 200 and the cell may have the same meaning.

The base station 200 is connected to the terminal 100 through an RF channel and controls a radio resource. The base station 200 may allocate a radio resource for transmitting and receiving packet data or control information to and from the terminal 100. Here, the radio resource may be an ultra wideband. The ultra wideband may include an ultra band based on millimeter wave. In this way, by operating an ultra band as a radio resource, the base station 200 may provide a large capacity of service with one base station 200, and the terminal 100 that accesses to the base station 200 may request a large capacity of service. The ultra band may represent, for example, a super high frequency (SHF) band or an extremely high frequency (EHF) band.

For example, an LTE system may use 20 MHz, which is a maximum system bandwidth, and an LTE-A system may use a frequency bandwidth of 100 MHz through Carrier Aggregation (CA) technology that aggregates component carriers of 20 MHz. However, as the base station 200 according to an exemplary embodiment of the present invention operates an ultra band of a frequency bandwidth or more, for example, 500 MHz, the terminal 100 may request a traffic service of, for example, 1 Gbps or more.

Such a base station 200 may construct an independent cellular network like a base station of an LTE or LTE-A system.

Further, the base station 200 may be connected to a neighboring base station through an X2 interface and exchange control information with the neighboring base station. Thereby, the base station 200 enables not to allocate a radio resource that a neighboring base station uses, thereby reducing signal interference with the neighboring base station.

The EPC 300 is a device that performs various control and traffic processing functions, and manages the base station 200 and the terminal 100. The EPC 300 may be connected to a plurality of base stations 200.

Figure 2:
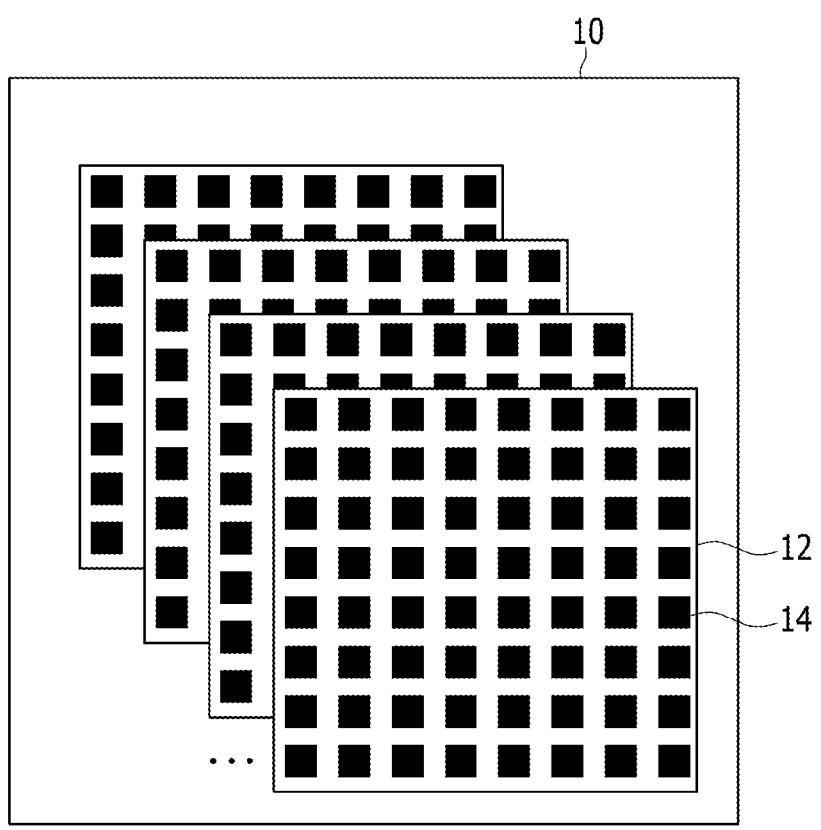
FIG. 2 is a diagram illustrating an array antenna assembly.

FIG. 2 is a diagram illustrating an array antenna assembly.

Referring to FIG. 2, an array antenna assembly 10 may include a plurality of array antenna modules 12. Further, each array antenna module 12 may include a plurality of antenna elements 14. The base station 200 and the terminal 100 may include the array antenna assembly 10.

The plurality of array antenna modules 12 may form one beam by cooperating, and the plurality of array antenna modules 12 each may form one beam. One antenna element 14 within one array antenna module 12 may form one beam. Here, it is assumed that one array antenna module 12 forms one beam.

Figure 3:
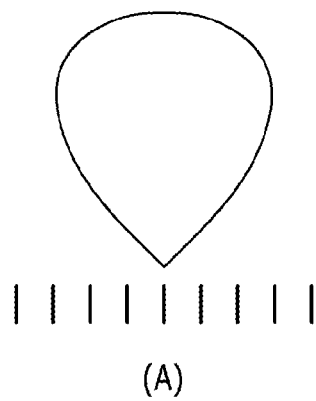
FIG. 3 is a diagram illustrating an example of a representative beam pattern that is generated by one array antenna module of FIG. 2.
Figure 3:
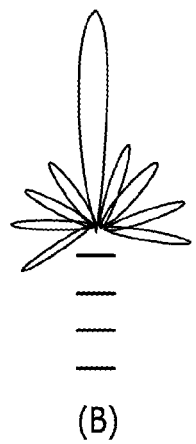
Figure 3:
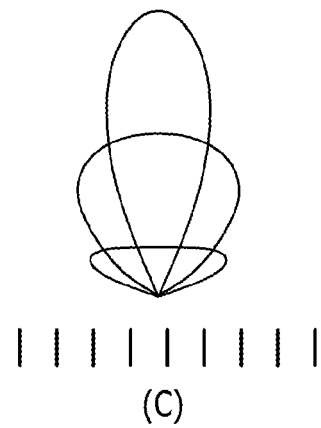

FIG. 3 is a diagram illustrating an example of a beam pattern that is generated by one array antenna module of FIG. 2.

Referring to FIG. 3, the array antenna module 12 may generate a beam pattern such as Broadside A, End-fire B, and Chevyshev C according to arrangement, shape, power, and phase control of a plurality of antenna elements 14.

Further, when one array antenna module 12 forms one end-fire beam, a beam may be adjusted to elevation and azimuth through a phase control of the antenna elements 14 of the array antenna module 12, thereby performing beam steering.

Figure 4:
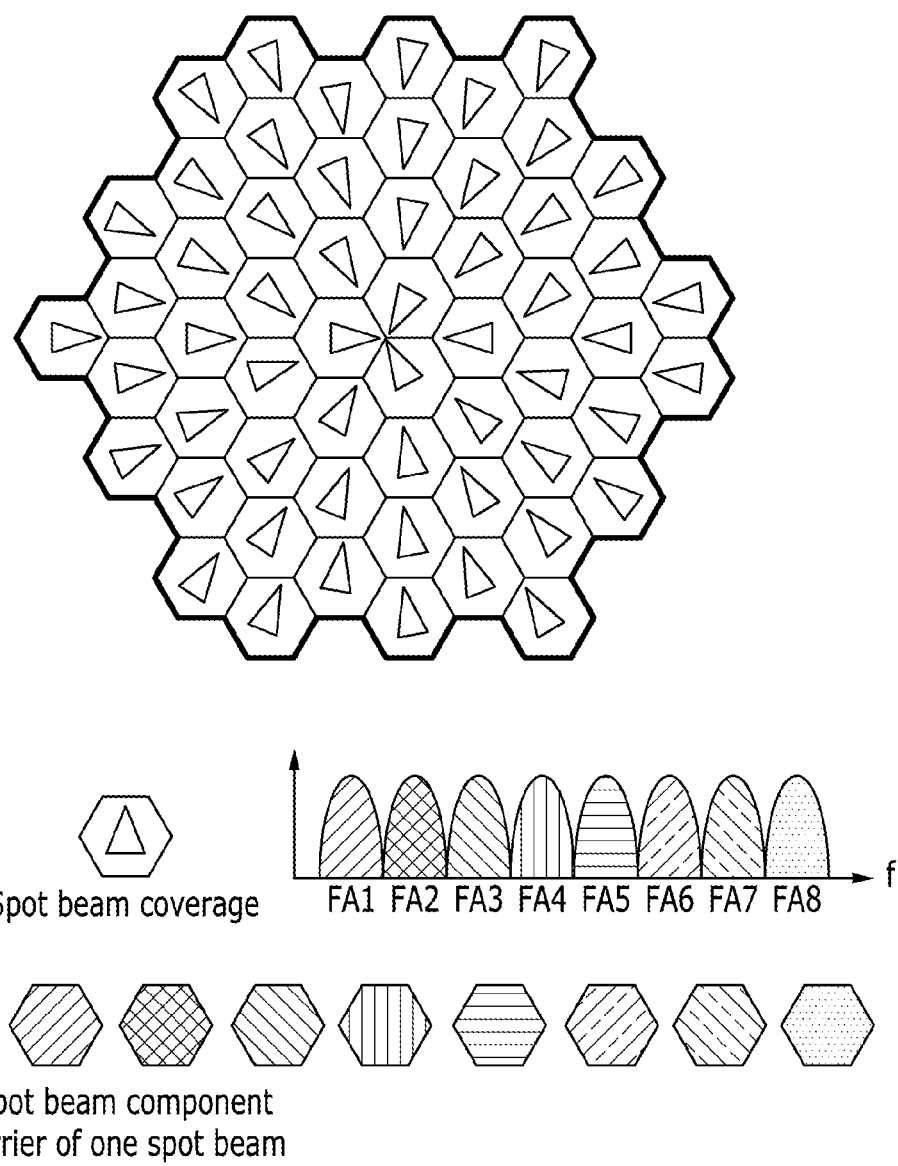
FIG. 4 is a diagram illustrating an example of service coverage of a base station that is formed with a plurality of spot beams that are formed by a plurality of array antenna modules that are mounted in one base station of FIG. 1.

FIG. 4 is a diagram illustrating an example of service coverage of a base station that is formed with a plurality of spot beams that are formed by a plurality of array antenna modules that are mounted in one base station of FIG. 1.

As shown in FIG. 4, each of 57 array antenna modules of the base station 200 forms an end-fire beam, thereby constituting service coverage of the base station 200. In this case, a beam that is formed by each array antenna module is referred to as a spot beam, and an area that the spot beam covers is referred to as spot beam coverage. That is, service coverage of the base station 200 may be generated with a plurality of spot beam coverages.

FIG. 4 illustrates a form in which a triangle is added to distinguish one spot beam coverage from existing cell coverage, and the triangle is spot beam coverage that is formed by an array antenna module from one location of the base station 200. That is, one base station 200 includes 57 array antenna modules and generates, for example, a beam of an end-fire form of FIG. 3(B) from each array antenna module, thereby forming 57 spot beam coverages. By combining 57 spot beam coverages, service coverage of the base station 200 may be formed.

One spot beam uses a wideband, and the base station 200 may divide and operate a wideband as a plurality of Frequency Allocations (FA), for example, 8 FA1-FA8. In this case, one FA may correspond to one component carrier. Therefore, by dividing one spot beam on an FA basis, the one spot beam may be referred to as a plurality of spot beam component carriers.

Figure 5:
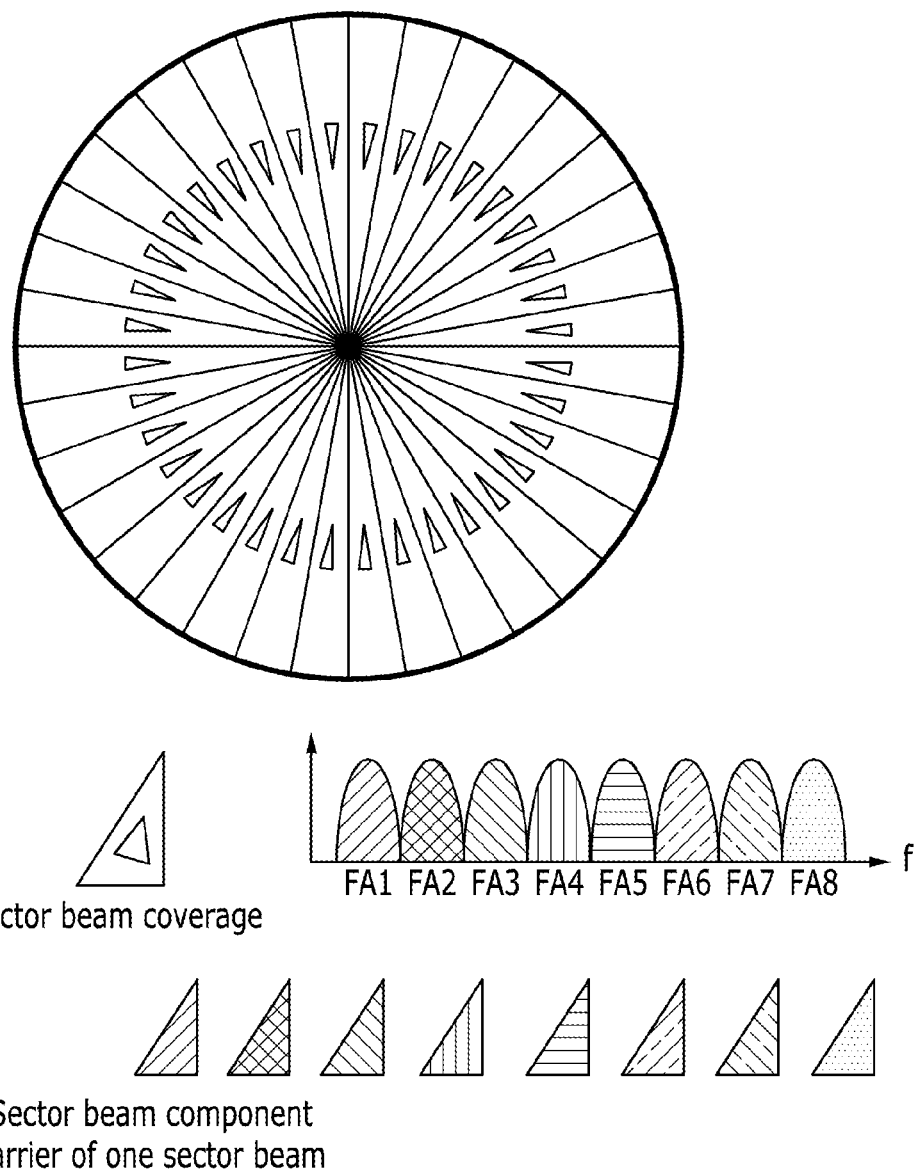
FIG. 5 is a diagram illustrating an example of service coverage of a base station that is formed with a plurality of sector beams that are formed by a plurality of array antenna modules that are mounted in one base station of FIG. 1.

FIG. 5 is a diagram illustrating an example of service coverage of a base station that is formed with a plurality of sector beams that are formed by a plurality of array antenna modules that are mounted in one base station of FIG. 1.

In FIG. 5, in order to distinguish one sector beam coverage from existing cell coverage, one sector beam coverage is illustrated in a form in which a triangle is added, and the triangle is sector beam coverage that is formed by an array antenna module from one location of the base station 200.

As shown in FIG. 5, the base station 200 includes 36 array antenna modules, and by generating a beam of a form of FIG. 3(A) or (C) from each array antenna module, the base station 200 may form 36 sector beam coverages. By combining 36 sector beam coverages, service coverage of the base station 200 may be formed.

One sector beam uses a wideband, and the base station 200 may divide and operate a wideband into a plurality of Frequency Allocations (FA), for example, 8 FA1-FA8. In this case, one FA may correspond to one component carrier. Therefore, by dividing one sector beam on an FA basis, the one sector beam may be referred to as a plurality of sector beam component carriers.

Figure 6:
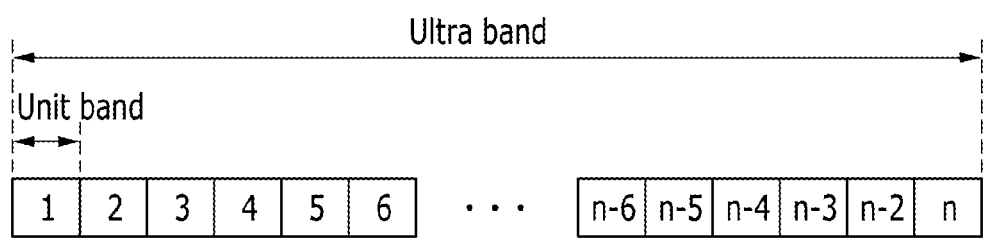
FIG. 6 is a diagram illustrating a method of operating a radio resource of a base station according to an exemplary embodiment of the present invention.
Figure 7:
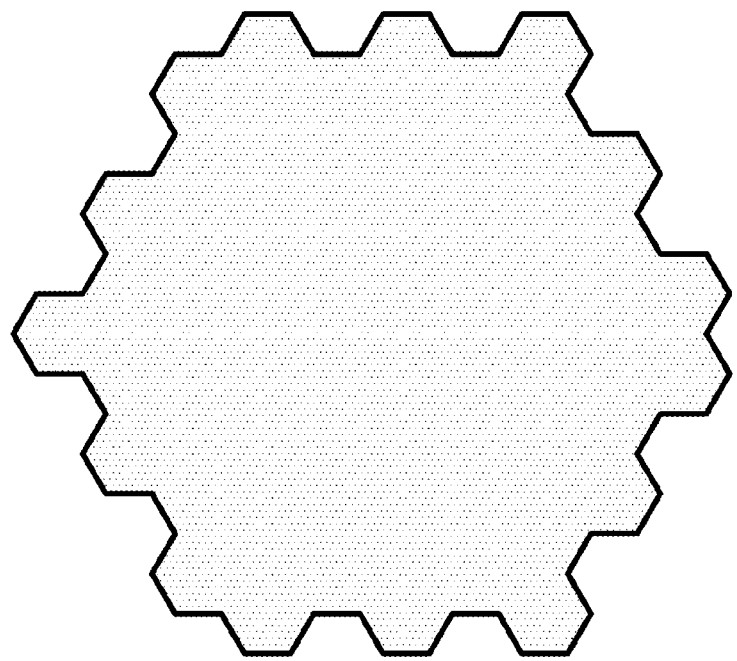
FIGS. 7 and 8 are diagrams illustrating an example of a grouping operation method of spot beam or sector beam component carriers in each L3 CP dedicated unit band.
Figure 8:
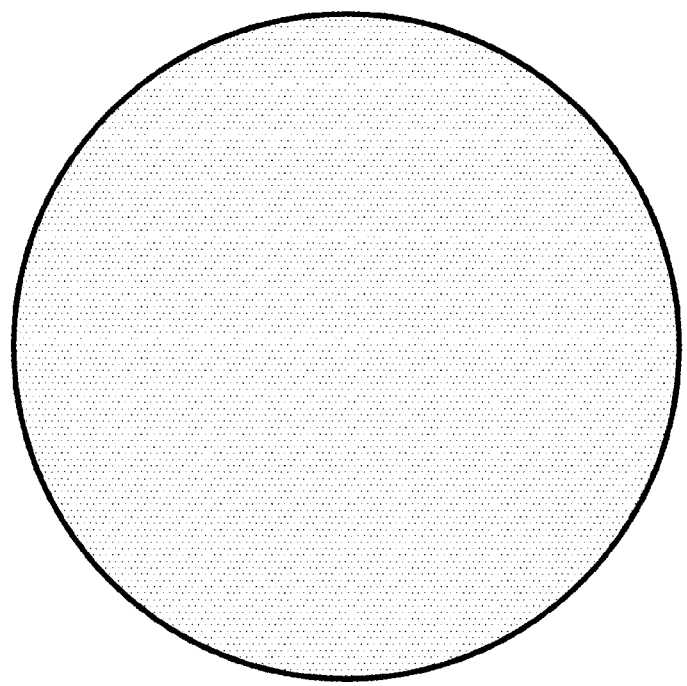

FIG. 6 is a diagram illustrating a method of operating a radio resource of a base station according to an exemplary embodiment of the present invention, and FIGS. 7 and 8 are diagrams illustrating an example of a grouping operation method of spot beam or sector beam component carriers in each L3 CP dedicated unit band.

Referring to FIG. 6, the base station 200 divides and operates an ultra band into a plurality of unit bands, i.e., an n number of unit bands.

In the mobile communication system, a transmitting mode is divided into a Frequency Division Duplex (FDD) transmitting mode and a Time Division Duplex (TDD) transmitting mode. The FDD transmitting mode distinguishes a transmitting and receiving resource of an uplink (UL) and a downlink (DL) with a frequency, thereby supporting bi-directional communication of the UL and the DL. The TDD transmitting mode distinguishes UL and DL transmitting and receiving resources with time, thereby supporting bi-directional communication of a UL and a DL.

In the FDD transmitting mode, the terminal 100 and the base station 200 divide and use a plurality of unit bands as a UL and a DL, and in the TDD transmitting mode, in one unit band, a UL and a DL may be processed.

The base station 200 divides and operates unit bands into a Layer 3 (L3) Control Plane (CP) dedicated unit band that performs a function of an L3 CP and a User Plane (UP) dedicated unit band that performs a data transmitting and receiving function of a UP. The terminal 100 divides and operates unit bands into an L3 CP dedicated unit band and a UP dedicated unit band according to a method of operating a radio resource of the base station 200.

The base station 200 may combine a plurality of beam component carriers belonging to a band that is designated to an L3 CP dedicated unit band and treat the plurality of beam component carriers as one resource.

For example, as shown in FIG. 4, in service coverage of the base station 200 by spot beams, when FA1 is determined to an L3 CP dedicated unit band of the corresponding base station 200, the base station 200 treats 57 spot beam component carriers belonging to FA1 as one cell resource, thereby generating a coverage layer for FA1, as shown in FIG. 7.

Further, for example, in service coverage of the base station 200 by sector beams of FIG. 5, when FA1 is determined to an L3 CP dedicated unit band of the corresponding base station 200, the base station 200 treats 36 sector beam component carriers belonging to FA1 as one cell resource, thereby generating a coverage layer for FA1, as shown in FIG. 8. A combination of one cell resource may enable to regard and schedule a radio resource (frequency) of each of several beam component carriers in a specific band as one cell resource, a downlink indicates in which the same signal and data are simultaneously downloaded to several beam component carriers, and an uplink is used to recognize signals of several beam component carriers as a radio resource of one uplink by combining.

That is, in frequency and time domains of a downlink, by scheduling to simultaneously download the same information to an entire beam constituting service coverage and in frequency and time domains of an uplink, by scheduling to upload the same information, interference between beams constituting service coverage may be removed.

In this way, because a cell that groups a beam of a corresponding band by setting to an L3 CP dedicated unit band is managed as the same resource, when many terminals are distributed in service coverage of the base station 200, interference in data transmission and reception between terminals may be removed.

Further, the base station 200 may treat an individual beam as a separate resource in a band that is designated to a UP dedicated unit band. For example, in service coverage of the base station 200 by spot beams of FIG. 4, when FA2, FA3, FA4, FA5, FA6, and FA7 are determined as a UP dedicated unit band of the corresponding base station 200, the base station 200 may generate 399 (=57 spot beams*7 FAs) UP exclusive spot beam component carriers and treat the UP exclusive spot beam component carriers as a separate resource, thereby generating a plurality of capacitor layers.

For example, in service coverage of the base station 200 by sector beams of FIG. 5, when FA2, FA3, FA4, FA5, FA6, and FA7 are determined as a UP dedicated unit band of the corresponding base station 200, the base station 200 may generate 252 (=36 sector beams*7 FAs) UP exclusive sector beam component carriers and treat the 252 UP exclusive sector beam component carriers as a separate resource, thereby generating a plurality of capacitor layers.

Further, the base station 200 may regard bands that are set as a UP dedicated unit band as one cell through smaller grouping than that of a beam component carrier of a coverage layer and control the bands as an independent resource.

In this way, the base station 200 may regard a beam component carrier corresponding to a predetermined band of bands that are set to a UP dedicated unit band to one cell and control the beam component carrier as an independent resource, and the predetermined band may be regarded as one cell through smaller grouping than that of a beam component carrier of a coverage layer to be controlled as an independent resource, and thus a capacitor layer that is grouped in various forms on a UP dedicated unit band basis may exist.

When many terminals are distributed in service coverage of the base station 200, an individual terminal may always attempt a service connection with an L3 CP exclusive band, and may select a most appropriate UP dedicated unit band when capacity is necessary and be connected to an appropriate beam component carrier group (cell) of a corresponding band.

In order to avoid interference of L3 signals between L3 CPs of a neighboring base station, the base station 200 may allocate a unit band different from that of a neighboring base station to an L3 CP dedicated unit band.

The base station 200 may allocate a unit band 1 to an L3 CP dedicated unit band, and another base station adjacent to the base station 200 may allocate a unit band 2 different from that of the base station 200 to an L3 CP dedicated unit band. In this case, the base station 200 may not allocate unit bands 1 and 2 to a UP dedicated unit band. Alternatively, the base station 200 may allocate an L3 CP dedicated unit band of a neighboring base station to a UP dedicated unit band, and in this case, the base station 200 may control to use a corresponding unit band at a different time from that of the neighboring base station.

Figure 9:
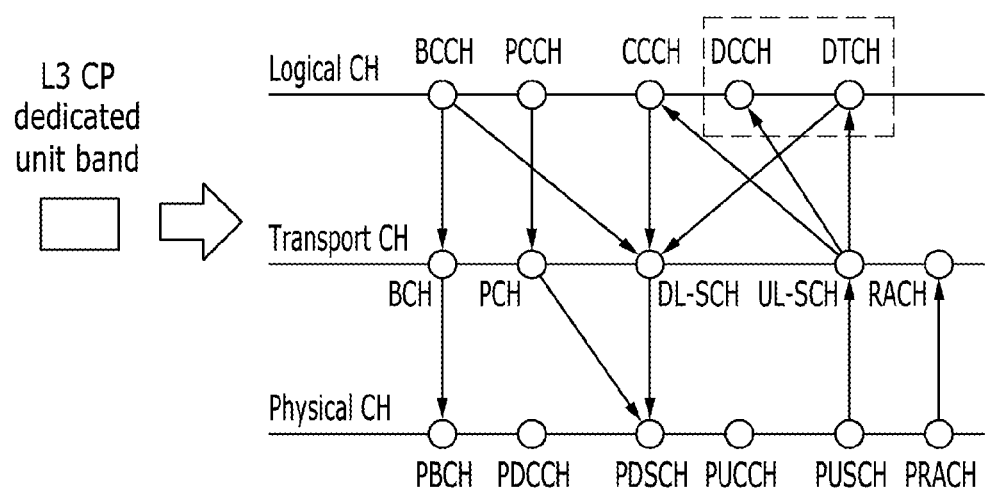
FIG. 9 is a diagram illustrating a mapping structure of a logic channel, a transport channel, and a physical channel on an L3 CP dedicated unit band according to an exemplary embodiment of the present invention.
Figure 10:
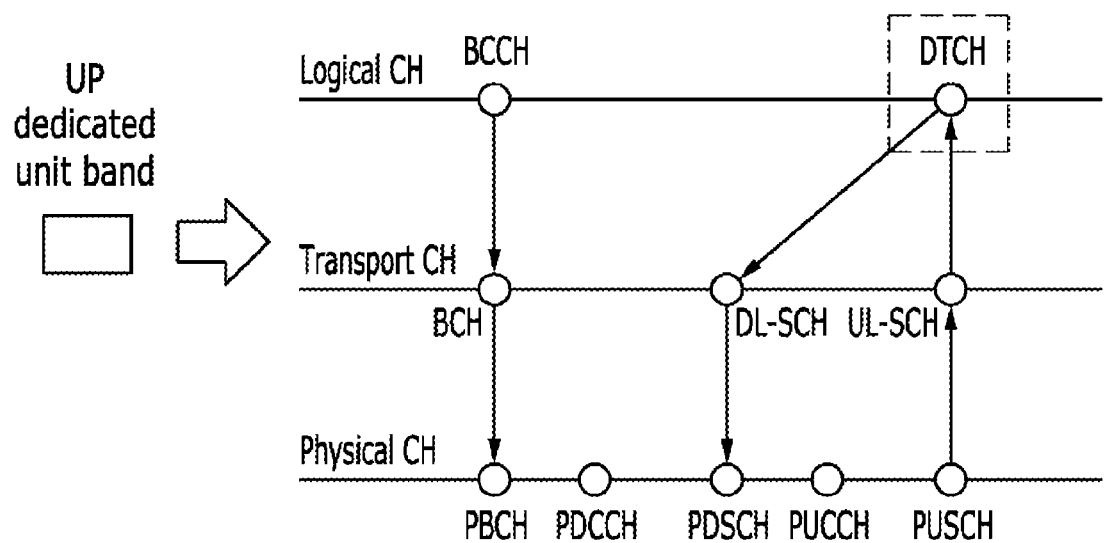
FIG. 10 is a diagram illustrating a mapping structure of a logic channel, a transport channel, and a physical channel on a UP dedicated unit band according to an exemplary embodiment of the present invention.

FIG. 9 is a diagram illustrating a mapping structure of a logic channel, a transport channel, and a physical channel on an L3 CP dedicated unit band according to an exemplary embodiment of the present invention, and FIG. 10 is a diagram illustrating a mapping structure of a logic channel, a transport channel, and a physical channel on a UP dedicated unit band according to an exemplary embodiment of the present invention.

Referring to FIG. 9, on an L3 CP dedicated unit band, a DL and UL mapping structure of a logic channel, a transport channel, and a physical channel may be designed very similarly to a mapping structure of existing LTE or LTE-A. MIB information is transmitted via a BCCH, a BCH, and a PBCH, and SI (SIB bundle) is transmitted via a DL-SCH and a PDSCH.

However, on an L3 CP dedicated unit band, IP traffic corresponding to a default bearer, i.e., traffic having no filtering condition or important user data corresponding to signaling on an IP such as an SIP, may be transmitted to the DTCH. Further, an RACH allows only an L3 CP dedicated unit band.

Referring to FIG. 10, on a UP dedicated unit band, only core information such as MIB is transmitted to a DL via a BCCH, a BCH, and a PBCH.

On a UP dedicated unit band, a CCCH, a DCCH, a PRACH, and a RACH do not exist, and only user data that is connected to only a DTCH is transmitted to the DL via a DL-SCH and a PDSCH, and only user data that is connected to only a DTCH is transmitted via a PUSCH and a UL-SCH to the UL. However, a PDCCH, a PDSCH, a PUCCH, and a PUSCH of a physical channel still exist.

MIB information that is commonly transmitted to an L3 CP dedicated unit band and a UP dedicated unit band may include DL bandwidth information, PHICH configuration information, and a system frame number, similarly to LTE or LTE-A, and may additionally include information that distinguishes whether the unit band is an L3 CP dedicated unit band or a UP dedicated unit band.

Figure 11:
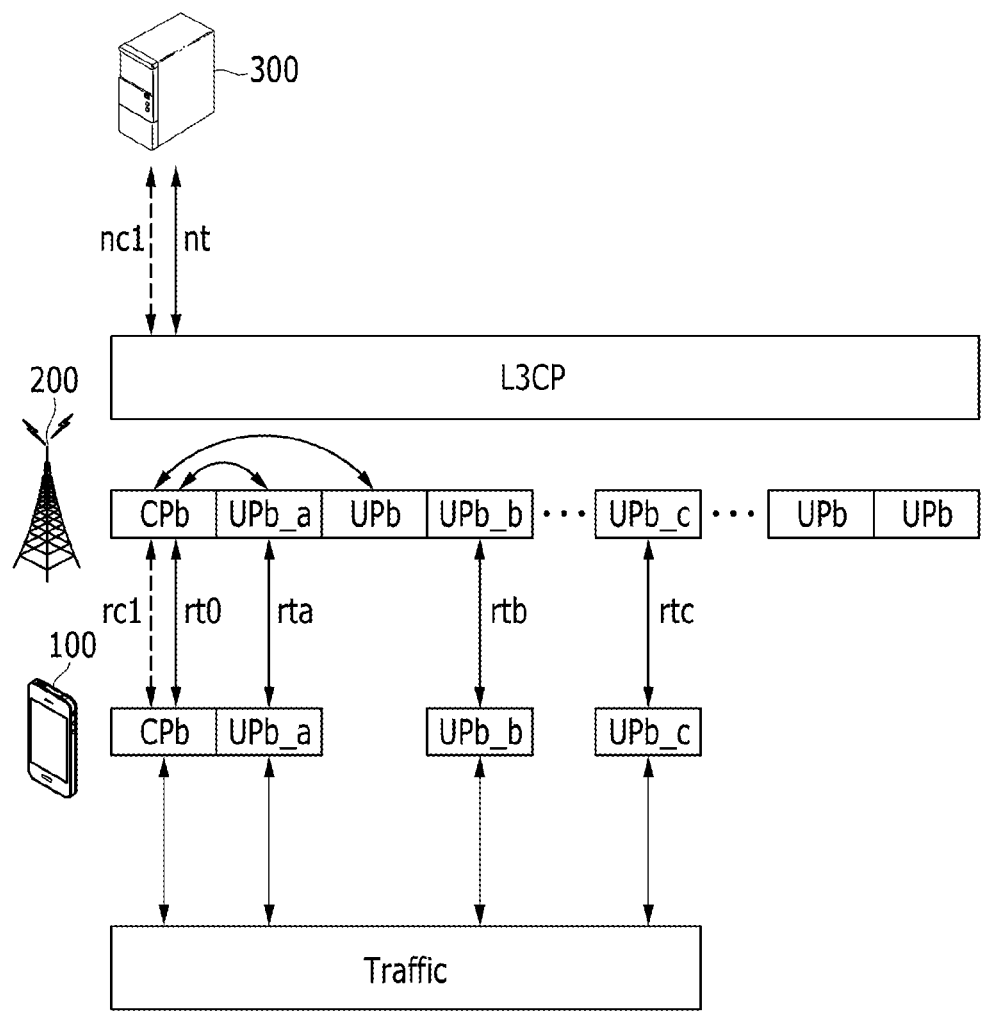
FIG. 11 is a diagram illustrating a method of operating a radio resource of a base station and a terminal according to an exemplary embodiment of the present invention.

FIG. 11 is a diagram illustrating a method of operating a radio resource of a base station and a terminal according to an exemplary embodiment of the present invention.

In FIG. 11, a network control interface (nc1) represents a control plane network interface between the base station 200 and the EPC 300 or a control plane network interface between base stations. A network traffic interface (nt) represents a user plane network interface between the base station 200 and the EPC 300 or a user plane network interface between base stations. A radio control interface 1 (Rc1) is a control plane interface for an RRC message, i.e., L3 signaling. A radio traffic interface (rt) is a data plane interface that interlocks with the nt to transmit and receive traffic to and from a gateway (not shown) through the UL and the DL or that forwards traffic to another base station.

Referring to FIG. 11, the base station 200 divides and operates an ultra band as a plurality of unit bands, operates some unit bands (CPb) of a plurality of unit bands with an L3 CP dedicated unit band for the terminal 100, and operates some other unit bands (UPb) with a UP dedicated unit band for the terminal 100.

The base station 200 may activate and operate at least some unit bands UPb_a, UPb_b, and UPb_c according to a traffic request capacity of a currently accessed terminal among UPbs operating as a UP dedicated unit band instead of activating and operating an entire UPb operating as a UP dedicated unit band.

The terminal 100 attempts an RACH through rc1 of an L3 CP dedicated unit band (CPb) in which initial random access is available, thereby being connected to an L3 CP exclusive CPb.

The terminal 100 may transmit and receive important user traffic through rt0 of an L3 CP dedicated unit band CPb.

When additional large capacity traffic transmission and reception is necessary, the terminal 100 may sequentially or at one time access UP dedicated unit bands UPb_a, UPb_b, and UPb_c through rta, rtb, and rtc, respectively, by L3 signaling of an L3 CP exclusive CPb.

The base station 200 may dynamically add or delete UP dedicated unit bands UPb_a, UPb_b, and UPb_c to correspond to transmitting and receiving performance of the terminal 100 and a requested traffic capacity of the terminal 100. The base station 200 may distribute traffic that is transferred through nt through rta, rtb, and rtc and transmit the traffic to the terminal 100.

In this way, the base station 200 quasi-statically operates a unit band according to a traffic request of the terminal 100 instead of fully operating an entire ultra band, thereby minimizing power consumption of the base station 200.

Further, the terminal 100 activates only a necessary unit band according to an instruction of the base station 200 to correspond to a current traffic request capacity instead of fully operating unit bands that are allocated to process a traffic capacity that can process to the maximum, thereby minimizing power consumption.

In this way, it may provide a large merit to both the base station 200 and the terminal 100 to divide and operate an ultra band as a unit band rather than to fully operate an ultra band in the base station 200, and may provide a merit that it can be dynamically applied to large capacity traffic.

Figure 12:
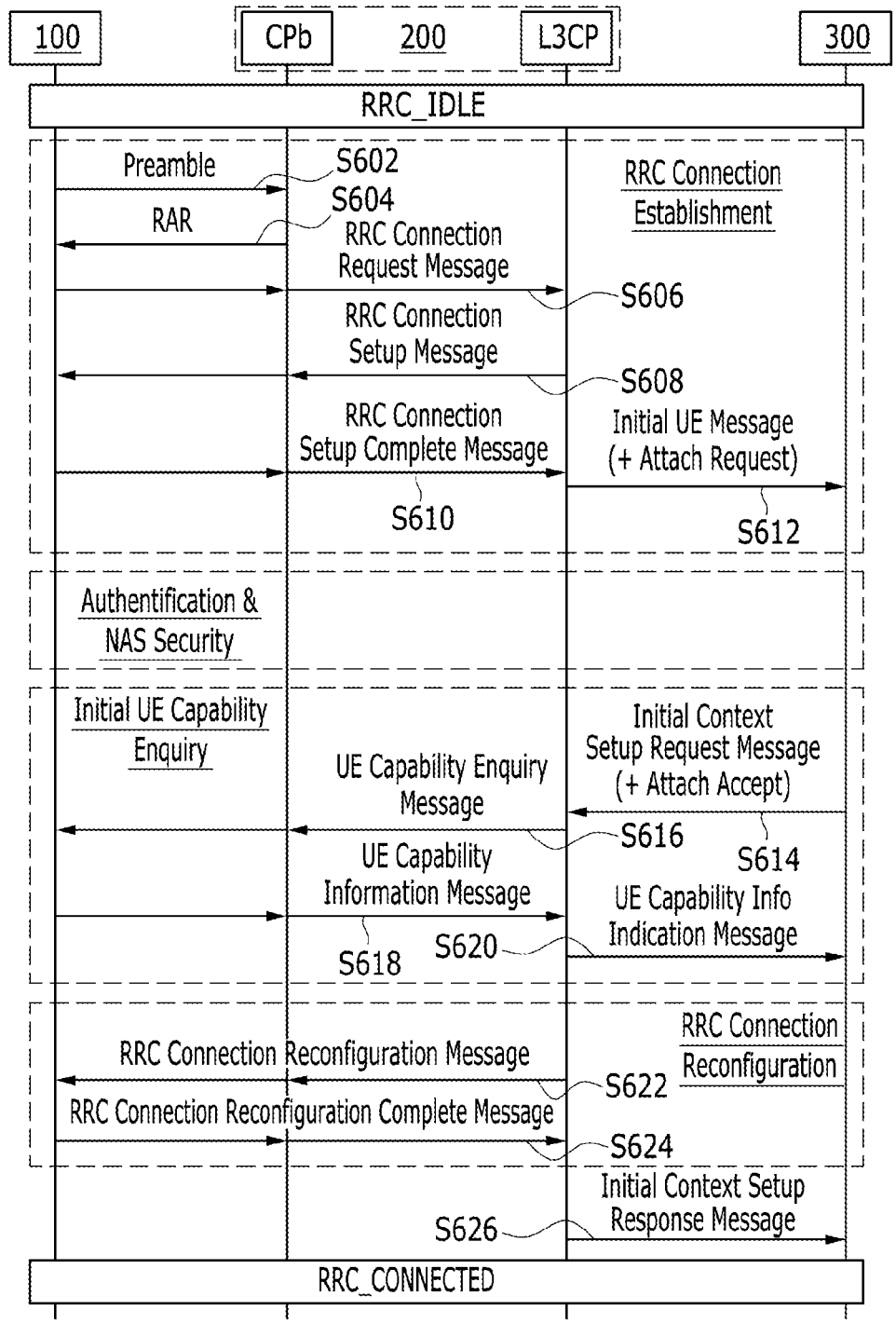
FIG. 12 is a diagram illustrating an RRC connecting setting method of a terminal for a radio resource operation of FIG. 5.

FIG. 12 is a diagram illustrating an RRC connecting setting method of a terminal for a radio resource operation of FIG. 11.

Referring to FIG. 12, RRC connection setting for a radio resource operation according to an exemplary embodiment of the present invention is similar to an RRC connection procedure in an LTE or LTE-A system, but is different in information receiving from the terminal 100 in an Initial UE Capability Enquiry procedure.

The terminal 100 is divided into an RRC_CONNECTED state and an RRC_IDLE state according to whether a connection of a radio resource control (hereinafter referred to as an RRC) to the EPC 300.

The terminal 100 performs an initial random access procedure in an RRC idle state. Initial random access can be performed with only an L3 CP dedicated unit band (CPb of FIG. 11). When an L3 CP dedicated unit band operation range is determined, by decoding MIB of a unit band within an operation range thereof, the terminal 100 may determine whether a corresponding unit band is used as an L3 CP dedicated unit band or as a UP dedicated unit band.

The terminal 100 attempts random access with an L3 CP dedicated unit band CPb in which signal intensity of an L3 CP dedicated unit band is largest. The terminal 100 transmits a preamble for random access to the base station 200 (S602), and the base station 200 having received the preamble transmits a random access response (RAR) to the terminal 100 (S604).

The terminal 100 transmits an RRC Connection Request message to the base station 200 (S606).

An L3 CP of the base station 200 having received the RRC Connection Request message transmits an RRC Connection Setup message to the terminal 100 (S608).

The terminal 100, having received the RRC Connection Setup message transmits an RRC Connection Setup Complete message to the base station 200 (S610).

When the base station 200 receives the RRC Connection Setup Complete message, the base station 200 includes an Attach Request message, which is a pig-tailed NAS message in the RRC Connection Setup Complete message in an Initial UE message, which is an S1AP message, and transmits the Initial UE Message to the EPC 300 (S612).

By a procedure up to now, RRC connection setting between the terminal 100 and the base station 200 is complete.

When an RRC connection setting procedure is complete, an Authentication & NAS Security procedure is performed, and the procedure is unrelated to an exemplary embodiment of the present invention, and thus a description thereof will be omitted.

Thereafter, an Initial UE Capability Enquiry procedure is performed.

The EPC 300 includes an Attach Accept message in an initial context setup request message and transmits the initial context setup request message to the base station 200 (S614). The initial context setup request message may include requesting quality of service (QoS) information of the terminal 100. The requested QoS information may include QoS information on a bearer basis.

The base station 200 having received the initial context setup request message transmits a UE Capability Enquiry message to the terminal 100 (S616), and the terminal 100 transmits UE Capability Information message to the base station 200 (S618). The UE Capability Information message may include a bitmap corresponding to the n number of unit bands and information about the number of available unit bands. Further, the UE Capability Information message includes other information representing performance of the terminal 100, for example, the number of antennas that can transmit and receive or whether carriers can be aggregated.

By representing with a bit 1 or 0 from a first unit band of the n number of unit bands, the terminal 100 may notify the base station 200 of a unit band that can use for the terminal 100 in the n number of unit bands through UE Capability Information message. The terminal 100 may determine an available unit band in consideration of a hardware state and a present situation. A bit 1 represents that addition is available, and a bit 0 represents that addition is unavailable. For example, the terminal 100 may include DL carrier frequency information of a unit band 1 and performance information of the terminal 100 about an available unit band among the n number of unit bands in UE Capability Information message by representing 1 or 0 on a unit band basis from a unit band 1. Alternatively, a bit 1 may represent that addition is available, and a bit 0 may represent that addition is unavailable.

The base station 200 having received UE Capability Information message stores performance information of the terminal 100 and simultaneously notifies the EPC 300 of performance information of the terminal 100 through UE Capability Info Indication message, which is an S1AP message (S620).

The base station 200 grasps individual performance of the currently accessed terminal 100 using performance information of stored terminals, and determines a unit band to operate in the terminal 100 based on individual performance of the terminal 100 and QoS request information of the terminal 100.

When traffic of the terminal 100 increases, the base station 200 may add an appropriate unit band to the terminal 100 in multilateral consideration of stored performance information of the terminal, a current unit band operation situation, and a unit band operation situation of other currently accessed terminals.

Similarly, when deactivation of a unit band operating in the base station 200 as well as addition of a unit band is necessary, the base station 200 may stop use of a corresponding unit band for a terminal using a corresponding unit band, and when traffic of the terminal 100 is reduced, the base station 200 may stop use of a unit band for the terminal 100.

The base station 200 may activate a deactivated operation UP dedicated unit band or deactivate an activated operation UP dedicated unit band according to an operation situation of a UP dedicated unit band of the base station 200, a unit band operation situation of accessed terminals, and a traffic change of accessed terminals, and may add or delete a UP dedicated unit band from one terminal viewpoint.

When it is determined that a QoS request of the initially accessed terminal 100 in an initial context setup request message cannot be satisfied with an L3 CP dedicated unit band, the base station 200 may add additionally necessary unit bands through an RRC Connection Reconfiguration procedure based on performance information of the terminal 100.

The base station 200 transfers an Initial Context Setup Response message to the EPC 300 (S626).

In an RRC Connection Reconfiguration procedure, the base station 200 transmits an RRC Connection Reconfiguration message to the terminal 100 through an L3 CP dedicated unit band (S622), and the terminal 100 transmits an RRC Connection Reconfiguration Complete message to the base station 200 through an L3 CP dedicated unit band (S624), thereby adding or deleting necessary unit bands.

The terminal 100 may be converted to an RRC connection state through such a process.

Figure 13:
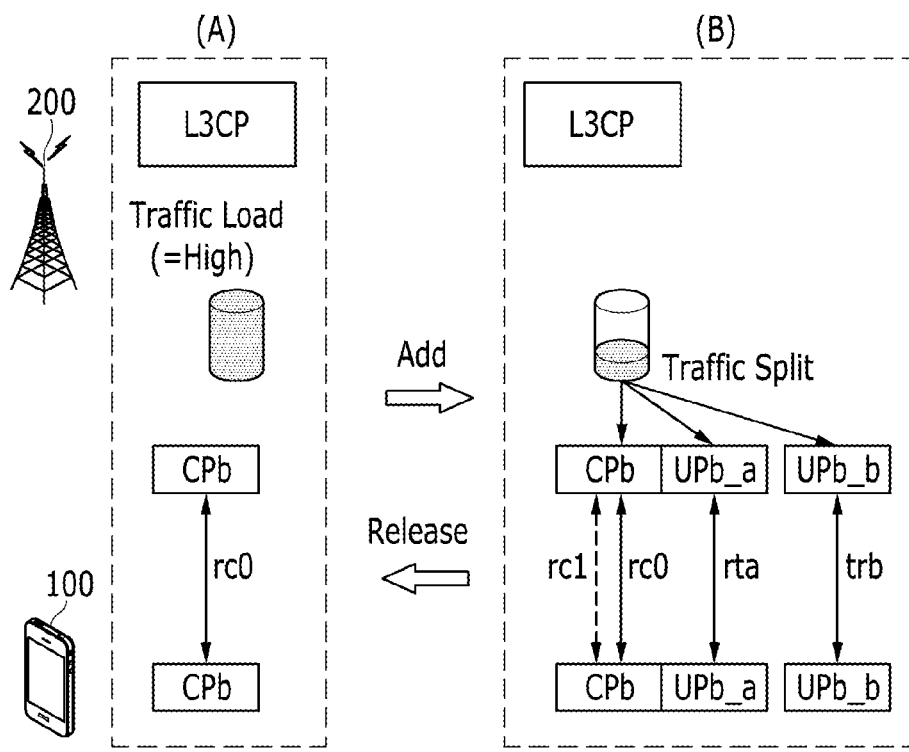
FIG. 13 is a diagram illustrating a method of adding and deleting a unit band through an RRC Connection Reconfiguration procedure according to an exemplary embodiment of the present invention.

FIG. 13 is a diagram illustrating a method of adding and deleting a unit band through an RRC Connection Reconfiguration procedure according to an exemplary embodiment of the present invention.

Referring to FIG. 13, after initial access of a terminal, the terminal 100 and the base station 200 use only an L3 CP dedicated unit band like A.

In this case, as a traffic load to the terminal 100 is high, when a traffic buffer of the terminal 100 approaches an overflow state, the base station 200 adds UP dedicated unit bands UPb_a and UPb_b like B.

Addition of such UP dedicated unit bands UPb_a and UPb_b may be performed by exchange of an RRC Connection Reconfiguration message and RRC Connection Reconfiguration Complete message through an rc1 interface in an L3 CP dedicated unit band CPb, as described in FIG. 12.

The base station 200 splits traffic to each of rta and rtb interfaces that UP dedicated unit bands UPb_a and UPb_b provide as well as an existing rt0 interface. Thereby, traffic may be immediately transmitted instead of being buffered and thus the traffic buffer again approaches an empty state.

In this way, when traffic is split, the base station 200 combines information that is provided in each MAC of a currently using unit band, thereby grasping an entire state of the traffic buffer.

Unlike an additional process of such a unit band, when it is determined that only one UP dedicated unit band may be used or it is unnecessary to use two entire UP dedicated unit bands without addition of UP dedicated unit bands UPb_a and UPb_b, by exchanging an RRC Connection Reconfiguration message and RRC Connection Reconfiguration Complete message with the terminal through an rc1 interface of an L3 CP dedicated unit band CPb, an L3 CP of the base station 200 may release the UP dedicated unit band.

That is, an RRC Connection Reconfiguration procedure of FIG. 12 is used to even addition of a UP dedicated unit band, but is used even when deleting. However, when adding and deleting a UP dedicated unit band, internal information treating in the RRC Connection Reconfiguration message may be different.

Table 1 represents an information element of an RRC Connection Reconfiguration message.

TABLE 1

RRCConnectionReconfiguration :: = {
PPUnitBandToReleaseList-r10 UPUnitBandToReleaseList
OPTIONAL, -- Need ON
PPUnitBandToAddModList-r10 UPUnitBandToAddModList TABLE 1-continued OPTIONAL, -- Need ON
}

As shown in Table 1, the RRC Connection Reconfiguration message includes a UP dedicated unit band release list (UPUnitbandToReleaseList), and a UP dedicated unit band that a current corresponding terminal is using may be released through the information.

Further, the RRC Connection Reconfiguration message includes a UP dedicated unit band add list (UPUnitBandToAddModList), and may add use of a UP dedicated unit band to a current corresponding terminal or may change a using UP dedicated unit band through the information.

TABLE 2

UPUnitBandToReleaseList ::= SEQUENCE (SIZE (1..maxUnitBand)) OF UPUnitBandIndex-r10
UPUnitBandIndex ::= INTEGER (1..n)

As shown in Table 2, when one terminal uses several UP dedicated unit bands with a UP dedicated unit band index (UPUnitBandIndex) that is given when adding a UP dedicated unit band, use of several UP dedicated unit bands in a list form may be stopped. In Table 2, a maxUnitBand represents the maximum number of unit bands.

Such a UP dedicated unit band index is given when adding a UP dedicated unit band by a UP dedicated unit band add list and is deleted using a UP dedicated unit band index that is given when releasing.

TABLE 3

| | |
|---|---|
| UPUnitBandToAddModList ::= | SEQUENCE (SIZE |
| (1..maxUPUnitBand)) OF UPUnitBandToAddMod | |
| UPUnitBandToAddMod ::= | SEQUENCE { |
|   UPUnitBandIndex | UPUnitBandIndex, |
|   Cell Identification | SEQUENCE { |
|     physCellId-r10 | PhysCellId, |
|     dl-CarrierFreq | MMWAVEOP-FREQUENCY |
|   } | |
|   RadioResourceConfigCommonUPUnit Band | |
|   RadioResourceConfigCommonUPUnitBand UPUnitBand Add | OPTIONAL, -- Cond |
|   RadioResourceConfigDedicatedSCell-r10 ResourceConfigDedicatedUPUnitBand UPUnitBand Add | Radio OPTIONAL, -- Cond |
| ... | |
| } | |

Further, as shown in Table 3, in order to add or change a UP dedicated unit band of the terminal 100, a parameter of an RRC Connection Reconfiguration message may be used. Use of a UP dedicated unit band may enable adding one or more UP dedicated unit bands in a UP dedicated unit band add list.

When one UP dedicated unit band is added, additional information of the unit band is input in a "UPUnitBandToAddMod" form, and a UP dedicated unit band index and a cell identification may be included. The UP dedicated unit band index is a simple separator for separating a UP dedicated unit band upon adding, and when stopping use of a UP dedicated unit band, i.e., when inputting the foregoing UP dedicated unit band release list, the separator is used. Further, the cell identification may include a physical cell identifier (PhysCellId) and MMWAVEOPFREQUENCY. The physical cell identifier may be commonly or differently allocated to an entire available UP dedicated unit band. A MMWAVEOPFREQUENCY is an operation frequency of a millimeter wave, represents a center frequency of each FA of FIG. 4 or 5, and is differently set to each unit band in one base station.

Further, in additional information, a radio resource configuration common UP unit band (RadioResourceConifg-CommonUPUnitBand) and a radio resource configuration dedicated UP unit band (RadioResourceConfigDedicatedU-PUnitBand) exist.

The radio resource configuration common UP unit band is a common information element of an additional UP dedicated unit band, and the inside thereof may be divided and set to DL information and UL information for a UP dedicated unit band to again add or change.

In DL information of the radio resource configuration common UP unit band, cell characteristic information (e.g., a bandwidth), general physical configuration information (e.g., antenna common information), control physical configuration information (e.g., PHICH), and physical configuration information (e.g., PDSCH common information and subframe assignment special subframe pattern) related to a physical channel may exist.

In UL information of the radio resource configuration common UP unit band, UL configuration information (e.g., UL frequency information, UL bandwidth, and additional spectrum emission information), maximum UL power information, common UL power control information, common sounding RS configuration information, UL cyclic prefix length, and common PUSCH information of a terminal may be included.

A radio resource configuration dedicated UP unit band is UE-Specific information of a UP dedicated unit band to add, and a radio resource configuration dedicated UP unit band may be divided and set to DL information and UL information.

In DL information of the radio resource configuration dedicated UP unit band terminal dependent antenna information, CSI-RS configuration information, and terminal dependent PDSCH information may be included, and in UL information of the radio resource configuration dedicated UP unit band, UL antenna information, terminal dependent PUSCH configuration information, terminal dependent UL power control information, CQI report configuration information, and terminal dependent UL sounding RS configuration information may be included.

In the foregoing description, it is assumed that an L3 CP dedicated unit band uses one unit band within a use ultra band of a base station corresponding to SHV/EHF. However, an L3 CP dedicated unit band may be selected and used in an existing cellular frequency band. However, in this case, within maximum common cell coverage that an ultra band that a base station uses can provide, cell coverage of an L3 CP dedicated unit band using an existing cellular frequency should be equally designed. In a downtown environment in which a population is dense, and a location such as a stadium, because cell planning is performed so that a cell radius of an existing cellular frequency is very small, if an ultra band based on a millimeter wave used in the same base station can fully cover the cell radius, the base station can perform large capacity processing more easily than construction of a cloud base station.

Figure 14:
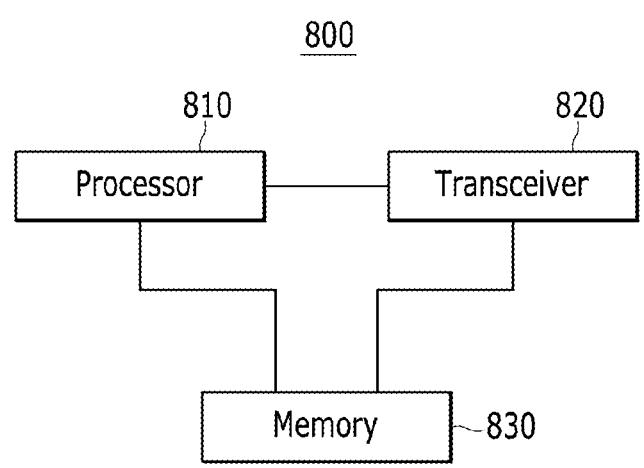
FIG. 14 is a block diagram illustrating a configuration of a radio resource management apparatus according to an exemplary embodiment of the present invention.

FIG. 14 is a block diagram illustrating a configuration of a radio resource management apparatus according to an exemplary embodiment of the present invention.

Referring to FIG. 14, a radio resource management apparatus 800 includes a processor 810, a transceiver 820, and a memory 830. The radio resource management apparatus 800 may be included in the base station 200 or may be the base station 200.

The processor 810 divides and operates an ultra wideband into a plurality of unit bands, as described with reference to FIG. 6, and divides and operates a plurality of unit bands as an L3 CP dedicated unit band and a UP dedicated unit band. By operating several beam component carriers using a band that is designated as an L3 CP dedicated unit band in one cell by grouping, the processor 810 uses the several beam component carriers as a coverage layer, and by operating as a cell by individually forming or by grouping beam component carriers to each band using a band that is designated as a UP dedicated unit band, the processor 810 uses the beam component carriers as a capacitor layer of various forms.

The processor 810 performs an initial random access procedure with a terminal through an L3 CP dedicated unit band, and allocates an L3 CP dedicated unit band and a UP dedicated unit band to an accessed terminal. The processor 810 may activate a deactivated operation UP dedicated unit band according to an operation situation of a UP dedicated unit band, a unit band operation situation of accessed terminals, and a traffic change of accessed terminals, or may deactivate an activated operation UP dedicated unit band instead of activating and operating an entire unit band operating as a UP dedicated unit band for a terminal. Particularly, the processor 810 may add or delete a UP dedicated unit band through an L3 CP dedicated unit band according to performance of a terminal and a requested traffic capacity of a terminal.

The processor 810 may add and delete a UP dedicated unit band through an RRC Connection Reconfiguration procedure.

The transceiver 820 transmits messages necessary for performing a procedure that is described with reference to FIG. 12 to the terminal and receives messages from the terminal. Further, the transceiver 820 transmits and receives traffic to and from the terminal.

The memory 830 stores performance information of an accessed terminal. Further, the memory 830 stores operation information of a UP dedicated unit band of the base station 200 and unit band operation situation information of accessed terminals.

Further, the memory 830 stores instructions for performing in the processor 810 or loads and temporarily stores an instruction from a storage device (not shown), and the processor 810 executes an instruction that is stored or loaded at the memory 830.

The processor 810 and the memory 830 are connected through a bus (not shown), and an input/output interface (not shown) may be connected to the bus. In this case, the transceiver 820 is connected to the input/output interface, and a peripheral device such as an input device, a display, a speaker, and a storage device may be connected to the input/output interface.

According to an exemplary embodiment of the present invention, a base station can efficiently manage an ultra wideband. Particularly, by providing a coverage layer by grouping a specific unit band in a beam while providing a capacitor layer for providing a large capacity of traffic to an accessed terminal, the base station can guarantee movement stability. Further, by dynamically allocating other unit bands for spatial temporal terminal distribution and a QoS request, power consumption of a terminal can be minimized. Further, by dynamically adjusting an operating unit band according to the number of accessed terminals, a low power environmentally-friendly base station can be realized.

An exemplary embodiment of the present invention may not only be embodied through the above-described apparatus and/or method, but may also be embodied through a program that executes a function corresponding to a configuration of the exemplary embodiment of the present invention or through a recording medium on which the program is recorded, and can be easily embodied by a person of ordinary skill in the art from a description of the foregoing exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of managing a radio resource of a base station in a mobile communication system, the method comprising:
    dividing a plurality of unit bands of an ultra wideband into a Layer 3 Control Plane (L3 CP) dedicated unit band and at least one User Plane (UP) dedicated unit band;
    using a plurality of beam component carriers corresponding to the L3 CP dedicated unit band in the L3 CP dedicated unit band as a coverage layer by grouping in one cell; and
    using a plurality of beam component carriers corresponding to the UP dedicated unit band in the UP dedicated unit band as a plurality of capacitor layers by grouping in a plurality of cells of a smaller size than that of the grouping.

2. The method of claim 1, wherein the using of a plurality of beam component carriers corresponding to the L3 CP dedicated unit band comprises: performing Radio Resource Control (RRC) connection setting with a terminal through the L3 CP dedicated unit band that is allocated to the terminal; and transmitting and receiving data to and from the terminal through the L3 CP dedicated unit band.

3. The method of claim 2, wherein the using of a plurality of beam component carriers corresponding to the UP dedicated unit band comprises: adding the UP dedicated unit band to the terminal based on a performance and a Quality of Service (QoS) request of the terminal; and deleting at least one of UP dedicated unit bands that are allocated to the terminal based on the performance and the QoS request of the terminal.

4. The method of claim 3, wherein the adding of the UP dedicated unit band comprises: transmitting an RRC connection reconfiguration message to the terminal in the L3 CP dedicated unit band; and receiving an RRC connection reconfiguration complete message from the terminal in the L3 CP dedicated unit band, wherein the RRC connection reconfiguration message comprises an index of the UP dedicated unit band to add.

5. The method of claim 3, wherein the deleting of at least one of UP dedicated unit bands comprises: transmitting an RRC connection reconfiguration message to the terminal in the L3 CP dedicated unit band; and receiving an RRC connection reconfiguration complete message from the terminal in the L3 CP dedicated unit band, wherein the RRC connection reconfiguration message comprises an index of the UP dedicated unit band to delete.

6. The method of claim 3, wherein the using of a plurality of beam component carriers corresponding to the UP dedicated unit band further comprises:
    transmitting a UE capability enquiry message to the terminal; and receiving a UE capability information message comprising performance information of the terminal from the terminal,
wherein the performance information of the terminal comprises bitmap having a value of 0 or 1 according to whether the performance information can be used to correspond to each of the plurality of unit bands.

7. The method of claim 3, wherein the transmitting and receiving of data comprises transmitting and receiving the data with the L3 CP dedicated unit band and the added UP dedicated unit band.

8. The method of claim 3, wherein the using of a plurality of beam component carriers corresponding to the UP dedicated unit band further comprises activating only a necessary unit band according to the QoS request of the terminal among UP dedicated unit bands that are allocated to the terminal.

9. The method of claim 1, wherein the using of a plurality of beam component carriers corresponding to the UP dedicated unit band comprises connecting a capacitor layer appropriate to a terminal based on a performance and a Quality of Service (QoS) request of the terminal among the plurality of capacitor layers.

10. The method of claim 1, wherein the using of a plurality of beam component carriers corresponding to the L3 CP dedicated unit band comprises allocating different unit bands between base stations to the L3 CP dedicated unit band.

11. The method of claim 1, wherein the using of a plurality of beam component carriers corresponding to the UP dedicated unit band comprises allocating, by a neighboring base station, a unit band that is allocated as the L3 CP dedicated unit band to the UP dedicated unit band of a terminal that is accessed to a time different from a neighboring base station.

12. A radio resource management apparatus of a base station in a mobile communication system, the radio resource management apparatus comprising: a processor that divides and operates a plurality of unit bands of an ultra wideband into a Layer 3 Control Plane (L3 CP) dedicated unit band and a User Plane (UP) dedicated unit band and that uses a plurality of beam component carriers corresponding to the L3 CP dedicated unit band as a coverage layer by grouping in one cell to service coverage comprising a plurality of beams and that uses a plurality of beam component carriers corresponding to a UP dedicated unit band as a plurality of capacitor layers by grouping in a plurality of cells of a smaller size than that of the grouping and that allocates a unit band to use as the L3 CP dedicated unit band and the UP dedicated unit band to an accessed terminal; and a transceiver that transmits and receives data to and from the terminal through a unit band that is allocated to the terminal.

13. The radio resource management apparatus of claim 12, wherein 5 the processor performs Radio Resource Control (RRC) connection setting and RRC connection reconfiguration with the terminal through a unit band that is allocated with the L3 CP dedicated unit band to the terminal and adds a unit band to use as the UP dedicated unit band to the terminal based on a performance and a Quality of Service (QoS) request of the terminal through the unit band that is allocated with the L3 CP dedicated unit band or deletes at least one unit band of UP dedicated unit bands that are allocated to the terminal.

14. The radio resource management apparatus of claim 13, wherein the processor adds the unit band through the RRC connection reconfiguration or deletes the at least one unit band.

15. The radio resource management apparatus of claim 13, wherein the processor transmits an RRC connection reconfiguration message to the terminal through the transceiver in the L3 CP dedicated unit band, and the RRC connection reconfiguration message comprises an index of the UP dedicated unit band to add or an index of the UP dedicated unit band to delete.

16. The radio resource management apparatus of claim 12, wherein the processor connects a capacitor layer appropriate to the terminal based on a performance and a Quality of Service (QoS) request of the terminal of the plurality of capacitor layers.

17. The radio resource management apparatus of claim 12, wherein 5 the processor allocates a unit band different from a neighboring base station to the L3 CP dedicated unit band of the terminal.

18. The radio resource management apparatus of claim 12, wherein the processor allocates a unit band that is allocated to the L3 CP dedicated unit band to a neighboring base station to the UP dedicated unit band at a different time from the neighboring base station.

19. The radio resource management apparatus of claim 12, wherein the transceiver receives performance information of the terminal from the terminal,
the processor allocates a unit band to use as the UP dedicated unit band based on performance information of the terminal, and
the performance information of the terminal comprises bitmap having a value of 0 or 1 according to whether the performance information can be used to correspond to each of the plurality of unit bands.

* * * * *